(12) United States Patent
Westerman et al.

(10) Patent No.: US 9,182,884 B2
(45) Date of Patent: Nov. 10, 2015

(54) PINCH-THROW AND TRANSLATION GESTURES

(71) Applicant: Apple Inc., Cupertino, CA (US)

(72) Inventors: Wayne Carl Westerman, Burlingame, CA (US); Brett G. Alten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/175,566

(22) Filed: Feb. 7, 2014

(65) Prior Publication Data

US 2014/0152604 A1 Jun. 5, 2014

Related U.S. Application Data

(62) Division of application No. 11/818,479, filed on Jun. 13, 2007, now Pat. No. 8,681,104.

(51) Int. Cl.
*G09G 3/04* (2006.01)
*G06F 3/0481* (2013.01)
*G06F 3/0488* (2013.01)
*G06F 3/038* (2013.01)
*G06F 3/041* (2006.01)
(Continued)

(52) U.S. Cl.
CPC ............ *G06F 3/04817* (2013.01); *G06F 3/038* (2013.01); *G06F 3/0416* (2013.01); *G06F 3/0485* (2013.01); *G06F 3/0486* (2013.01); *G06F 3/0488* (2013.01); *G06F 3/04883* (2013.01); *G06K 9/00335* (2013.01); *G06F 2203/04808* (2013.01)

(58) Field of Classification Search
CPC ............................ G06F 3/04845; G06F 3/0485

USPC .................................. 345/173–178; 715/863
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Final Office Action mailed Jul. 19, 2011, for U.S. Appl. No. 11/818,479, filed Jun. 13, 2007, 20 pages.
(Continued)

*Primary Examiner* — Gene W Lee
(74) *Attorney, Agent, or Firm* — Morrison & Foerster LLP

(57) ABSTRACT

The detection of finger pinch, rotate, and tap gestures along with a translation and optionally liftoff motion to initiate certain actions is disclosed. To detect both the gesture and the translation, a certain amount of gesture scaling speed can be detected along with a certain amount of translation speed and distance traveled. For a finger pinch gesture, the scaling speed can be computed as the dot product of the velocity vectors of two or more fingers coming together. For a finger rotation gesture, the scaling speed can be computed as a cross product of the velocity vectors of the rotating fingers. The translation speed of a gesture can be computed as the average of the velocity vectors of any fingers involved in the gesture. The amount of gesture scaling speed and translation speed needed to trigger the recognition of a combined gesture with translation can be a predetermined ratio.

23 Claims, 11 Drawing Sheets

(51) Int. Cl.
*G06K 9/00* (2006.01)
*G06F 3/0485* (2013.01)
*G06F 3/0486* (2013.01)

(56) References Cited

U.S. PATENT DOCUMENTS

| | | | |
|---|---|---|---|
| 5,590,219 | A | 12/1996 | Gourdol |
| 5,612,719 | A | 3/1997 | Beernink et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,222,465 | B1 | 4/2001 | Kumar et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,714,221 | B1 | 3/2004 | Christie et al. |
| 7,015,894 | B2 | 3/2006 | Morohoshi |
| 7,030,861 | B1 | 4/2006 | Westerman et al. |
| 7,184,064 | B2 | 2/2007 | Zimmerman et al. |
| 7,190,356 | B2 | 3/2007 | Lin et al. |
| 7,411,575 | B2 | 8/2008 | Hill et al. |
| 7,519,223 | B2 | 4/2009 | Dehlin et al. |
| 7,663,607 | B2 | 2/2010 | Hotelling et al. |
| 8,356,259 | B2 | 1/2013 | Sugiura |
| 8,479,122 | B2 | 7/2013 | Hotelling et al. |
| 8,681,104 | B2 | 3/2014 | Westerman et al. |
| 2002/0036618 | A1 | 3/2002 | Wakai et al. |
| 2002/0093491 | A1 | 7/2002 | Gillespie et al. |
| 2005/0099398 | A1* | 5/2005 | Garside et al. ............... 345/173 |
| 2005/0104867 | A1 | 5/2005 | Westerman et al. |
| 2006/0026521 | A1 | 2/2006 | Hotelling et al. |
| 2006/0066588 | A1* | 3/2006 | Lyon et al. .................... 345/173 |
| 2006/0097991 | A1 | 5/2006 | Hotelling et al. |
| 2006/0197753 | A1 | 9/2006 | Hotelling |
| 2006/0238522 | A1 | 10/2006 | Westerman et al. |
| 2006/0279548 | A1* | 12/2006 | Geaghan ....................... 345/173 |
| 2007/0132738 | A1 | 6/2007 | Lowles et al. |
| 2007/0132743 | A1* | 6/2007 | Bayramoglu ................. 345/177 |
| 2007/0257891 | A1 | 11/2007 | Esenther et al. |
| 2008/0084400 | A1* | 4/2008 | Rosenberg .................... 345/173 |
| 2008/0158145 | A1 | 7/2008 | Westerman |
| 2008/0158170 | A1 | 7/2008 | Herz et al. |
| 2008/0158172 | A1 | 7/2008 | Hotelling et al. |
| 2008/0309632 | A1 | 12/2008 | Westerman et al. |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed May 23, 2013, for U.S. Appl. No. 11/818,479, filed Jun. 13, 2007, 23 pages.

Notice of Allowance mailed Nov. 22, 2013, for U.S. Appl. No. 11/818,479, filed Jun. 13, 2007, 25 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

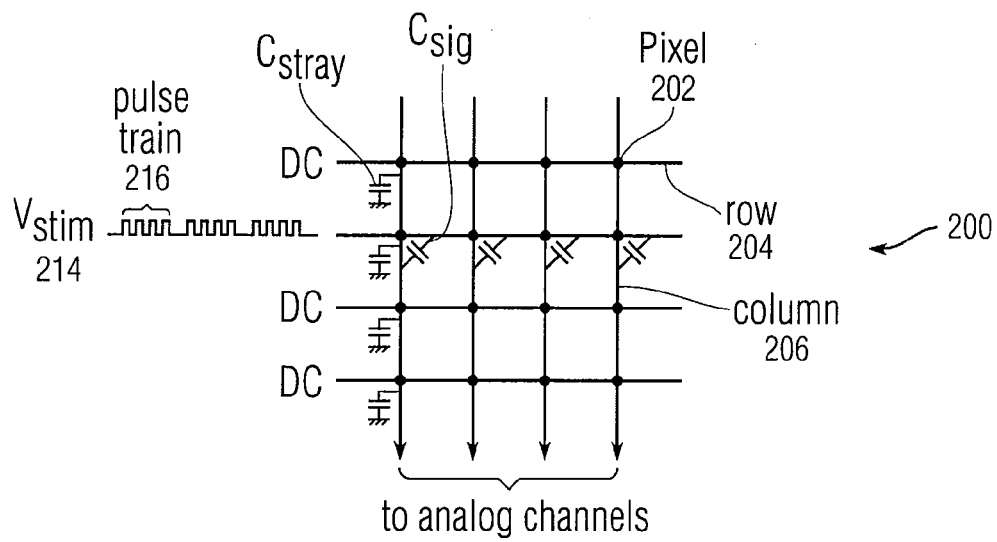
Fig. 2a
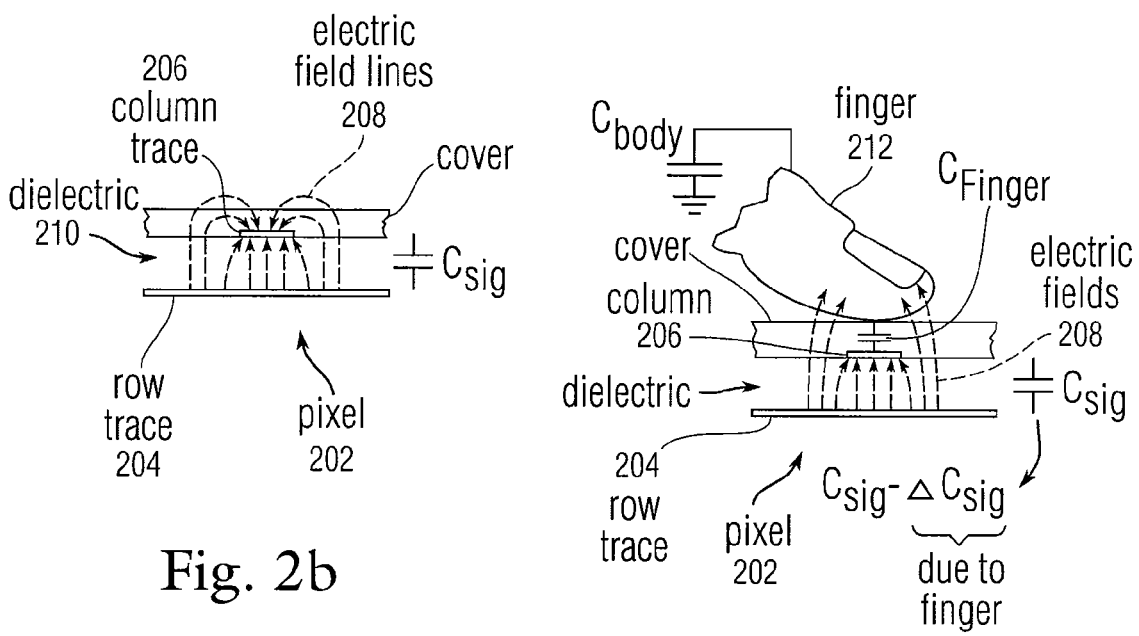
Fig. 2b
Fig. 2c

PINCH-THROW AND TRANSLATION GESTURES

FIELD OF THE INVENTION

This relates to finger gestures detectable at the surface of a touch sensor panel, and more particularly, to the detection of finger pinch, rotate, and tap gestures along with translation and optionally liftoff motion to initiate certain actions.

BACKGROUND OF THE INVENTION

There exist today many styles of input devices for performing operations in a computer system. The operations generally correspond to moving a cursor and making selections on a display screen. The operations can also include paging, scrolling, panning, zooming, etc. By way of example, the input devices can include buttons, switches, keyboards, mice, trackballs, touch pads, joy sticks, touch screens and the like. Each of these devices has advantages and disadvantages that can be taken into account when designing a computer system.

With touch pad instruments such as touch pads on a personal laptop computer, the movement of the input pointer on a display generally corresponds to the relative movements of the user's finger (or stylus) as the finger is moved along a surface of the touch pad. Touch screens, on the other hand, are a type of display screen that can include a touch-sensitive transparent panel (or "skin") that can overlay the display screen. When using a touch screen, a user typically makes a selection on the display screen by pointing directly to objects (such as graphical user interface (GUI) objects) displayed on the screen (usually with a stylus or finger).

To provide additional functionality, finger and hand gestures have been implemented with some of these input devices. By way of example, in touch pads, selections can be made when one or more taps are detected on the surface of the touch pad. In some cases, any portion of the touch pad can be tapped, and in other cases a dedicated portion of the touch pad can be tapped. In addition to selections, scrolling can be initiated by using finger motion at the edge of the touch pad.

U.S. Pat. Nos. 5,612,719 and 5,590,219, assigned to Apple Computer, Inc. (which has since changed its name to Apple Inc.) describe some other uses of gesturing. U.S. Pat. No. 5,612,719 discloses an onscreen button that is responsive to at least two different button gestures made on the screen on or near the button. U.S. Pat. No. 5,590,219 discloses a method for recognizing an ellipse-type gesture input on a display screen of a computer system.

In recent times, more advanced gestures have been implemented. For example, scrolling can be initiated by placing four fingers on the touch pad so that the scrolling gesture is recognized, and thereafter moving these fingers on the touch pad to perform scrolling events. These advanced gestures, however, can be in many instances counterintuitive.

SUMMARY OF THE INVENTION

This relates to the detection of finger pinch, rotate, and tap gestures along with a translation and optionally liftoff motion to initiate certain actions. These gestures can allow a user to more efficiently and accurately effect intended operations. To detect both the gesture and the translation, a certain amount of gesture scaling speed can be detected, where applicable, along with a certain amount of translation speed and distance traveled. For a finger pinch gesture, the scaling speed can be computed as the dot product of the velocity vectors of two or more fingers coming together. For a finger rotation gesture, the scaling speed can be computed as a cross product of the velocity vectors of the rotating fingers. The translation speed of a gesture can be computed as the average of the velocity vectors of any fingers involved in the gesture. The amount of gesture scaling speed and translation speed needed to trigger the recognition of a combined gesture with translation can be a predetermined ratio. In addition, the translation distance can be integrated over time, and if the distance exceeds a predetermined threshold, the combined gesture/translation can be recognized as an actionable gesture.

If finger liftoff is part of the combined gesture/translation, liftoff can be detected as an absence of an image of touch (or a reduced image of touch indicative of fingers now hovering over the sensor panel rather than touching it) in a particular location of the sensor panel as compared to previously captured images of touch. Speed at the time of liftoff can be determined by comparing finger patch positions in frames just prior to liftoff to determine velocity at liftoff. If the velocity of sliding fingers at liftoff exceeds a predetermined threshold, the combined gesture/translation/liftoff can be recognized as an actionable gesture.

BRIEF DESCRIPTION OF THE DRAWINGS

FIG. 2a illustrates an exemplary mutual capacitance touch sensor panel according to one embodiment of this invention.

FIG. 2b is a side view of an exemplary pixel in a steady-state (no-touch) condition according to one embodiment of this invention.

FIG. 2c is a side view of an exemplary pixel in a dynamic (touch) condition according to one embodiment of this invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the detection of finger pinch, rotate, and tap gestures along with a translation and optionally liftoff motion to initiate certain actions. These gestures can allow a user to more efficiently and accurately effect intended operations. To detect both the gesture and the translation, a certain amount of gesture scaling speed can be detected, where applicable, along with a certain amount of translation speed and distance traveled. For a finger pinch gesture, the scaling speed can be computed as the dot product of the velocity vectors of two or more fingers coming together. For a finger rotation gesture, the scaling speed can be computed as a cross product of the velocity vectors of the rotating fingers. The translation speed of a gesture can be computed as the average of the velocity vectors of any fingers involved in the gesture. The amount of gesture scaling speed and translation speed needed to trigger the recognition of a combined gesture with translation can be a predetermined ratio. In addition, the translation distance can be integrated over time, and if the distance exceeds a predetermined threshold, the combined gesture/translation can be recognized as an actionable gesture.

If finger liftoff is part of the combined gesture/translation, liftoff can be detected as an absence of an image of touch (or a reduced image of touch indicative of fingers now hovering over the sensor panel rather than touching it) in a particular location of the sensor panel as compared to previously captured images of touch. Speed at the time of liftoff can be determined by comparing finger patch positions in frames just prior to liftoff to determine velocity at liftoff. If the velocity of sliding fingers at liftoff exceeds a predetermined threshold, the combined gesture/translation/liftoff can be recognized as an actionable gesture.

Although some embodiments of this invention may be described generally herein in terms of touch sensor panels, it should be understood that embodiments of the invention can be applicable to touchscreens and touch tablets (touch sensor panels without a display device), both of which can include far-field proximity sensors in addition to touch sensors.

Figure 1A:
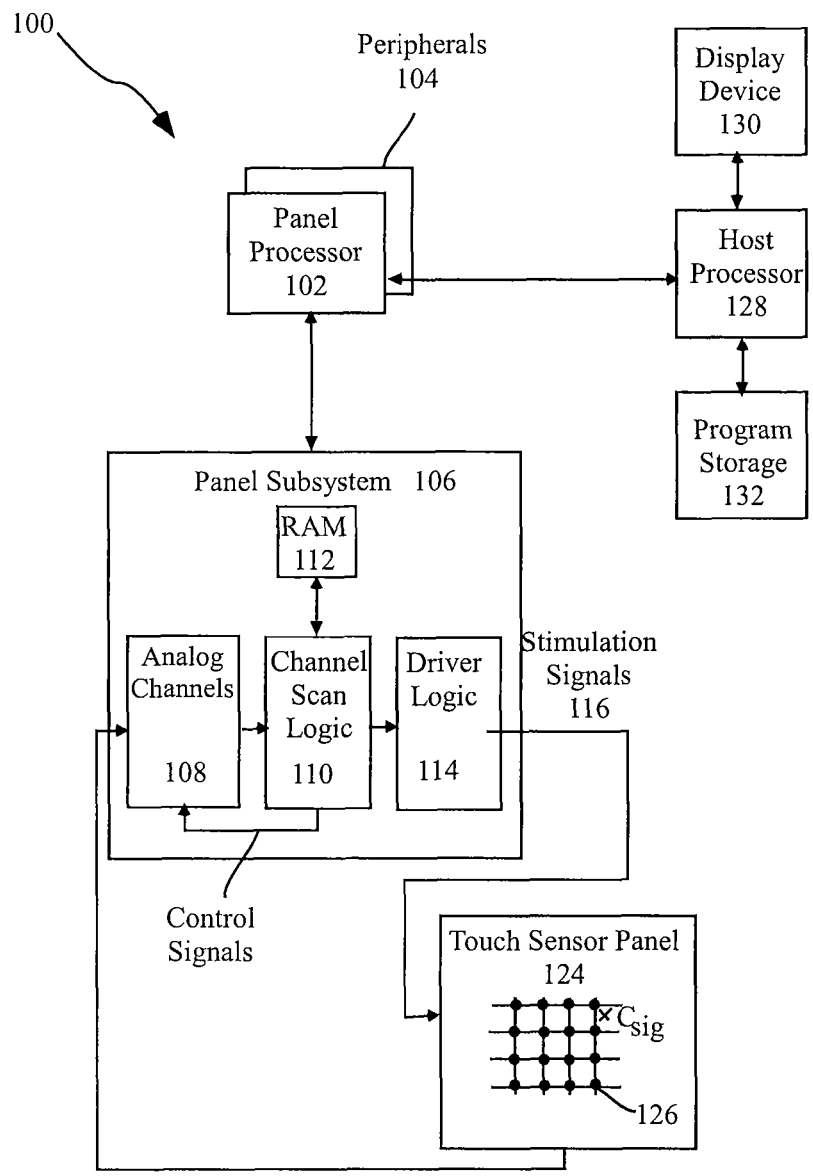
FIG. 1a illustrates an exemplary computing system that can detect finger pinch, rotate, and tap gestures along with translation and liftoff motions to initiate certain actions according to one embodiment of this invention.

FIG. 1a illustrates exemplary computing system 100 that can detect pinch-throw, rotate, and click gestures along with a translation and liftoff motion to initiate certain actions according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. One or more panel processors 102 or host processor 128 can execute software or firmware implementing the algorithm for distinguishing sloppy taps from sliding motions according to embodiments of the invention. Peripherals 104 can include, but are not limited to, random access memory (RAM) or other types of memory or storage, watchdog timers and the like. Panel subsystem 106 can include, but is not limited to, one or more analog channels 108, channel scan logic 110 and driver logic 114. Channel scan logic 110 can access RAM 112, autonomously read data from the analog channels and provide control for the analog channels. In addition, channel scan logic 110 can control driver logic 114 to generate stimulation signals 116 at one or more frequencies and phases that can be selectively applied to rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substantially transparent substrate separated by a substantially transparent dielectric material, on opposite sides of the substrate, or on two separate substrates separated by the dielectric material.

At the "intersections" of the traces, where the traces pass above and below (cross) each other (but do not make direct electrical contact with each other), the traces can essentially form two electrodes (although more than two traces could intersect as well) representing a capacitive sensor. Each capacitive sensor can be viewed as picture element (pixel) 126, which can be particularly useful when touch sensor panel 124 is viewed as capturing an "image" of touch over a frame (one complete scan of the panel). (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance $C_{sig}$ when the given row is stimulated with an alternating current (AC) signal. The presence of a finger or other object near or on the touch sensor panel can be detected by measuring changes to a signal charge $Q_{sig}$ present at the pixels being touched, which is a function of $C_{sig}$. Each column of touch sensor panel 124 can drive one or more analog channels 108 (also referred to herein as an event detection and demodulation circuit) in panel subsystem 106. Each analog channel 108 can generate a value representative of an amount of touch being sensed at the connected column, which can be indicative of a touch event at one or more pixels along that column. Touch sensor panel 124 can include single-touch or multi-touch sensor panels, the latter of which is described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Computing system 100 can correspond to a personal computer system, such as a desktop, laptop, tablet or handheld computer. Computing system 100 can also correspond to a computing device, such as a mobile telephone, personal digital assistant (PDA), dedicated media player, consumer electronic device, and the like. Computing system 100 can include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

Figure 1B:
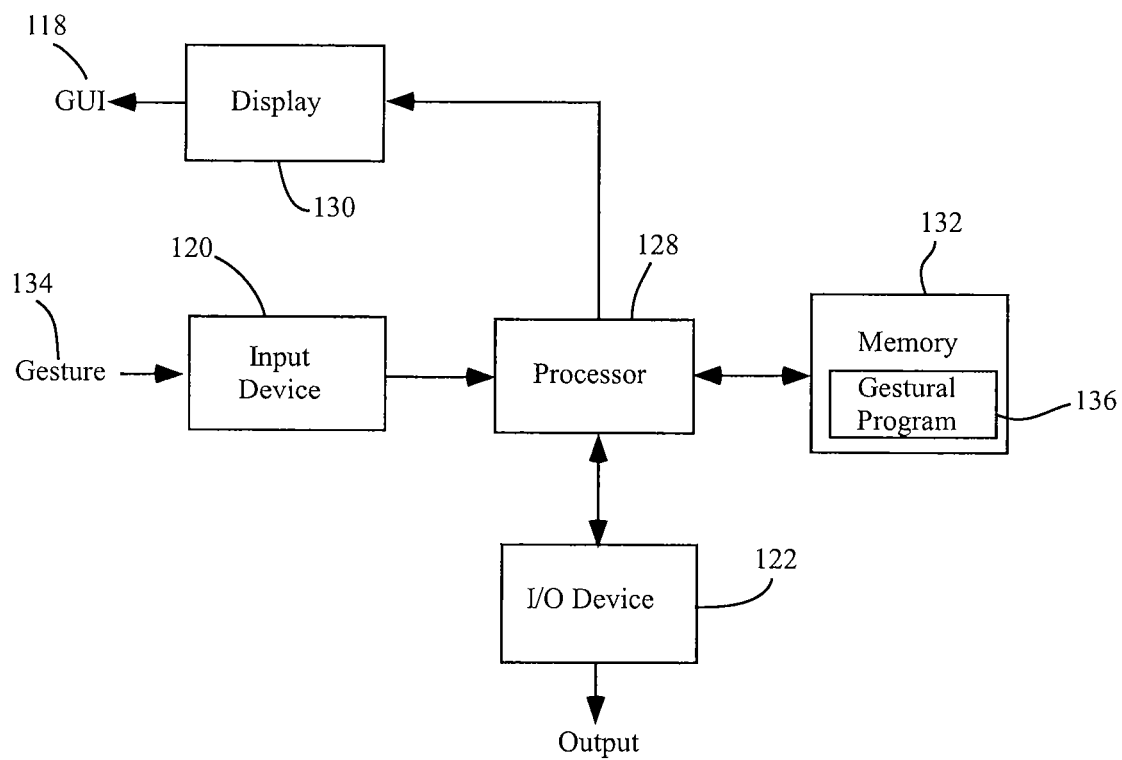
FIG. 1b is a block diagram of the exemplary host processor of FIG. 1a and connected devices according to one embodiment of this invention.

FIG. 1*b* is a block diagram of the exemplary host processor 128 of FIG. 1*a* and connected devices according to embodiments of the invention. Host processor 128 can be configured to execute instructions and to carry out operations associated with computing system 100. For example, using instructions retrieved from program storage 132, host processor 100 can control the reception and manipulation of input and output data between components of computing system 100. Host processor 128 can be implemented on a single-chip, multiple chips or multiple electrical components. For example, various architectures can be used for host processor 128, including a dedicated or embedded processor, a single purpose processor, controller, application specific integrated circuit (ASIC), and so forth.

In most cases, processor 128 together with an operating system (OS) can operate to execute computer code and produce and use data. OSs are generally well known and will not be described in greater detail. By way of example, the OS can correspond to OS/2, DOS, Unix, Linux, Palm OS, and the like. The OS can also be a special purpose OS, such as can be used for limited purpose appliance-type computing devices. The OS, other computer code and data can reside within memory block 132 that is operatively coupled to processor 128. Memory block 132 can generally provide a place to store computer code and data that are used by computing system 100. By way of example, memory block 132 can include Read-Only Memory (ROM), RAM, one or more hard disk drives and/or the like. The information can also reside on a removable storage medium and loaded or installed onto computing system 100 when needed. Removable storage mediums can include, for example, CD-ROMs, PC-CARDs, memory cards, floppy disks, magnetic tape, and a network component.

Computing system 100 can also include display device 130 that can be operatively coupled to processor 128. Display device 130 can be a liquid crystal display (LCD) (e.g., active matrix, passive matrix and the like). Alternatively, display device 130 can be a monitor such as a monochrome display, color graphics adapter (CGA) display, enhanced graphics adapter (EGA) display, variable-graphics-array (VGA) display, super VGA display, cathode ray tube (CRT), and the like. Display device 130 can also correspond to a plasma display or a display implemented with electronic inks.

Display device 130 can be configured to display GUI 118 that can provide an easy to use interface between a user of the computer system and the operating system or application running thereon. Generally speaking, GUI 118 can represent programs, files and operational options with graphical images, objects, or vector representations. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith. By way of example, a user can select a button that opens, closes, minimizes, or maximizes a window, or an icon that launches a particular program. GUI 118 can additionally or alternatively display information, such as non interactive text and graphics, for the user on display device 130.

Computing system 100 can also include input device 120 that can be operatively coupled to processor 128. Input device 120 can be configured to transfer data from the outside world into computing system 100. Input device 120 can, for example, be used to perform tracking and to make selections with respect to GUI 118 on display 130. Input device 120 can also be used to issue commands in computing system 100. Input device 120 can include a touch sensing device such as touch sensor panel 124, configured to receive input from a user's touch and send this information to processor 128 through panel subsystem 106. In many cases, the touch-sensing device can recognize touches as well as the position and magnitude of touches on a touch sensitive surface. The touch sensing device can detect and report the touches to processor 128, and processor 128 can interpret the touches in accordance with its programming. For example, processor 128 can initiate a task in accordance with a particular touch. A dedicated processor can be used to process touches locally and reduce demand for the main processor of the computing system.

The touch sensing device can be based on sensing technologies including but not limited to capacitive sensing, resistive sensing, surface acoustic wave sensing, pressure sensing, optical sensing, and/or the like. Furthermore, the touch sensing means can be based on single point sensing or multipoint sensing. Single point sensing is capable of only distinguishing a single touch, while multipoint sensing is capable of distinguishing multiple touches that occur at the same time.

As discussed above, input device 120 can be a touch screen that can be positioned over or in front of display 130, integrated with display device 130, or can be a separate component, such as a touch pad.

Computing system 100 can also include capabilities for coupling to one or more I/O devices 122. By way of example, I/O devices 122 can correspond to keyboards, printers, scanners, cameras, microphones, speakers, and/or the like. I/O devices 122 can be integrated with computing system 100 or they can be separate components (e.g., peripheral devices). In some cases, I/O devices 122 can be connected to computing system 190 through wired connections (e.g., cables/ports). In other cases, I/O devices 122 can be connected to computing system 100 through wireless connections. By way of example, the data link can correspond to PS/2, USB, IR, Firewire, RF, Bluetooth or the like.

According to embodiments of the invention, computing system 100 can be designed to recognize gestures 134 applied to input device 120 and to control aspects of computing system 100 based on the gestures. In some cases, a gesture can be defined as a stylized interaction with an input device that can be mapped to one or more specific computing operations. Gestures 134 can be made through various hand, and more particularly finger motions. Alternatively or additionally, the gestures can be made with a stylus. In all of these cases, input device 120 can receive gestures 134, and processor 128 can execute instructions to carry out operations associated with the gestures 134. In addition, memory block 132 can include gesture operational program 136, which can be part of the OS or a separate application. Gesture operation program 136 can generally include a set of instructions that can recognize the occurrence of gestures 134 and can inform one or more software agents of the gestures and/or what action(s) to take in response to the gestures. Additional details regarding the various gestures that can be used as input commands are discussed further below.

Upon a user performing one or more gestures, input device 120 can relay gesture information to processor 128. Using instructions from memory 132, and more particularly, gesture operational program 136, processor 128 can interpret the gestures 134 and control different components of computing system 100, such as memory 132, display 130 and I/O devices 122, based on the gestures. Gestures 134 can be identified as commands for performing actions in applications stored in memory 132, modifying image objects shown on display 130, modifying data stored in memory 132, and/or for performing actions in I/O devices 122.

Note that although FIG. 1b illustrates input device 120 and display 130 as two separate boxes for illustration purposes, the two boxes can be realized on one device. It should also be noted that, while FIG. 1a illustrates dedicated panel processor 102, panel subsystem 106 can be controlled directly by the host processor 128. Additionally, it should also be noted that touch sensor panel 124 and display device 130 can be integrated into a single touch screen display device.

FIG. 2a illustrates exemplary mutual capacitance touch sensor panel 200 according to embodiments of the invention. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). In the example of FIG. 2a, AC stimuli Vstim 214, Vstim 215 and Vstim 217 can be applied to several rows, while other rows can be connected to DC. Vstim 214, Vstim 215 and Vstim 217 can be at different frequencies and phases, as will be explained later. Each stimulation signal on a row can cause a charge Qsig=Csig×Vstim to be injected into the columns through the mutual capacitance present at the affected pixels. A change in the injected charge (Qsig_sense) can be detected when a finger, palm or other object is present at one or more of the affected pixels. Vstim signals 214, 215 and 217 can include one or more pulse trains 216, and each pulse train can include a particular number of a number of pulses. Although pulse trains 216 are shown as square waves, other waveshapes such as sine waves can also be employed. Note that although FIG. 2a illustrates rows 204 and columns 206 as being substantially perpendicular, they need not be so aligned, as described above. As described above, each column 206 can be connected to an analog channel (see analog channels 108 in FIG. 1).

FIG. 2b is a side view of exemplary pixel 202 in a steady-state (no-touch) condition according to embodiments of the invention. In FIG. 2b, an electric field of electric field lines 208 of the mutual capacitance between column 206 and row 204 traces or electrodes separated by dielectric 210 is shown.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Further details of multi-touch sensor detection, including proximity detection by a touch panel, are described in commonly assigned and co-pending (1) U.S. application Ser. No. 10/840,862 entitled "Multipoint Touchscreen," which was published on May 11, 2006 as U.S. Publication No. US2006/0097991, and issued on Feb. 16, 2010 as U.S. Pat. No. 7,663,607, (2) U.S. application Ser. No. 11/428,522 entitled "Identifying Contacts On A Touch Surface," which was published on Oct. 26, 2006 as U.S. Publication No. 2006/0238522, and (3) U.S. application Ser. No. 11/649,998 entitled "Proximity and Multi-Touch Sensor Detection and Demodulation," which was published on Jul. 3, 2008 as U.S. Publication No. 2008/0158172, the entirety of each of which is hereby incorporated herein by reference.

Figure 3:
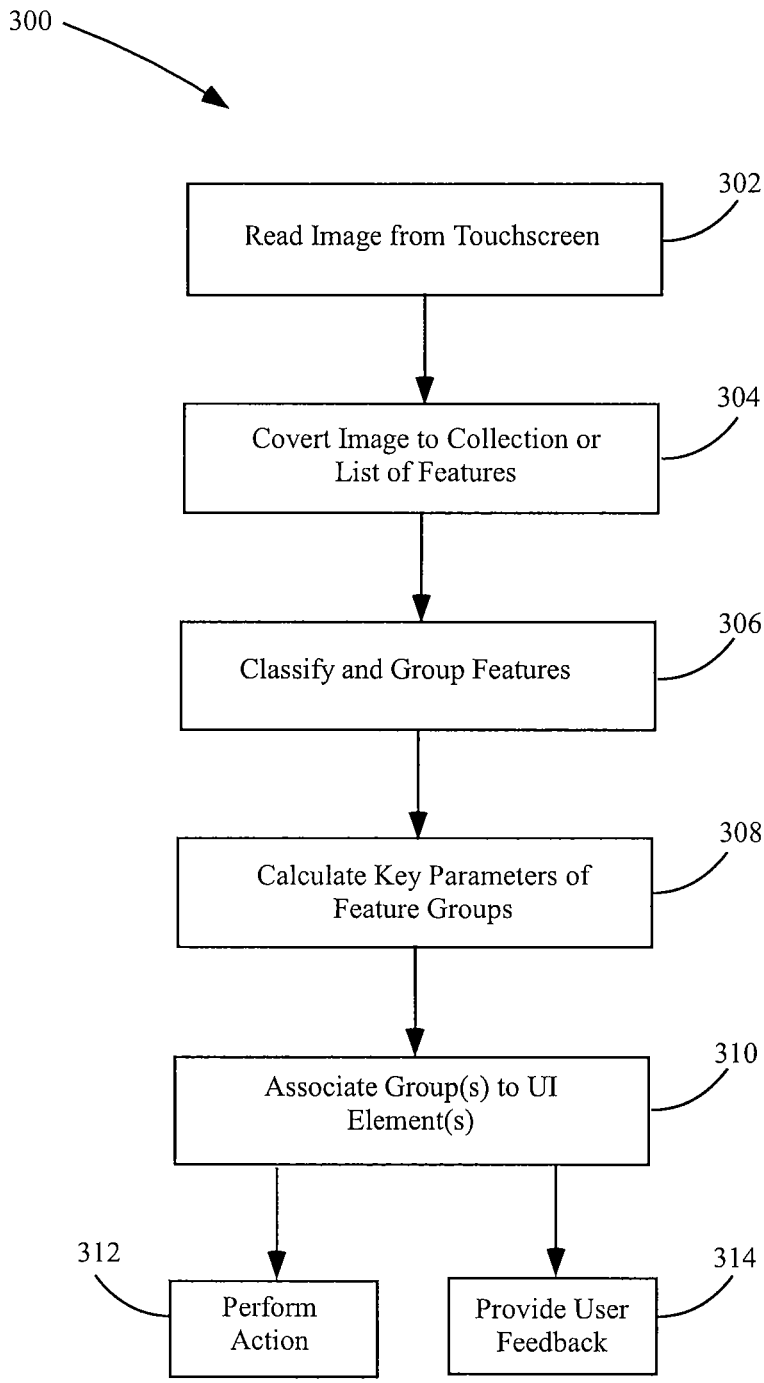
FIG. 3 is an exemplary multipoint processing method according to one embodiment of this invention.

FIG. 3 illustrates multipoint processing method 300 in accordance with embodiments of the invention. Multipoint processing method 300 can, for example, be performed with the system shown in FIG. 1a or FIG. 1b. Multipoint processing method 300 generally begins at block 302 where images can be read from a multipoint input device, and more particularly a multipoint touch screen. Although the term "image" may be used, it should be noted that the data can come in other forms. In most cases, the image read from the touch sensor panel can provide magnitude (Z) as a function of position (X and Y) for each sensing point or pixel of the touch sensor panel. The magnitude can, for example, reflect the capacitance measured at each point.

Following block 302, multipoint processing method 300 proceeds to block 304, where the image can be converted into a collection or list of features. Each feature can represent a distinct input such as a touch. In most cases, each feature can include its own unique identifier (ID), x coordinate, y coordinate, Z magnitude, angle $\Theta$, area A, and the like.

Figure 4A:
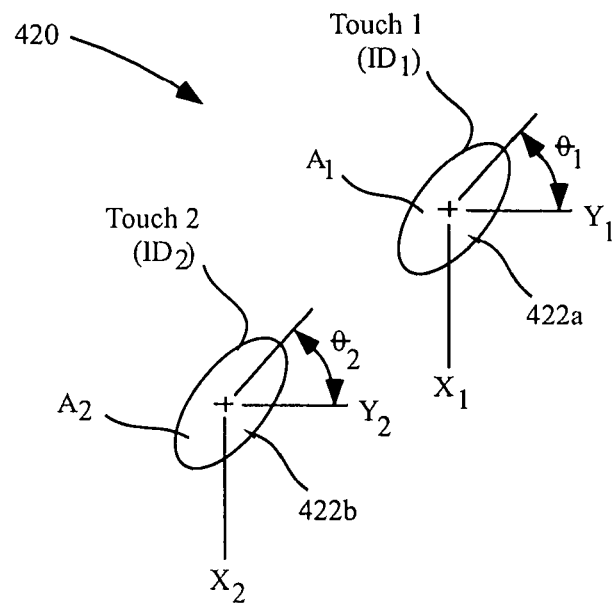
FIGS. 4a and 4b illustrate an exemplary image in time according to one embodiment of this invention.
Figure 4B:
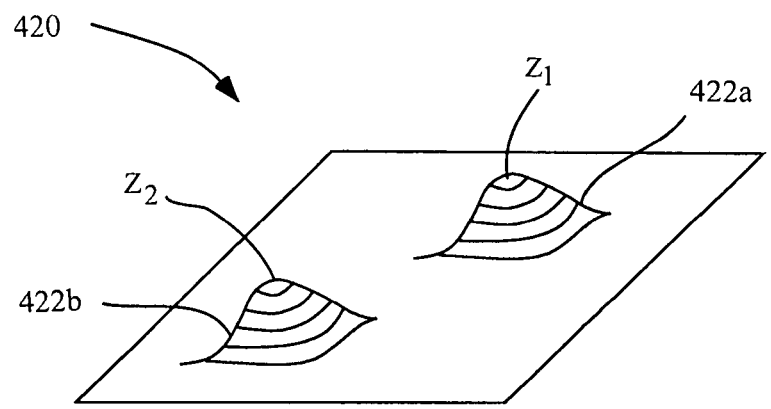

FIGS. 4a and 4b illustrate an exemplary image 420 in time according to embodiments of the invention. In image 420, there are two features 422 based on two distinct touches. The touches can for example be formed from a pair of fingers touching the touch screen. As shown, each feature 422 can include unique identifier (ID), x coordinate, y coordinate, Z magnitude, angle $\Theta$, and area A. More particularly, the first feature 422A can be represented by $ID_1, X_1, Y_1, Z_1, \Theta_1, A_1$ and the second feature 422B can be represented by $ID_2, X_2, Y_2, Z_2, \Theta_2, A_2$. This data can be outputted for example using a multi-touch protocol.

The conversion from data or images to features can be accomplished using methods described in copending U.S. application Ser. No. 10/840,862 titled "Multipoint Touchscreen." As disclosed therein, the raw data can be received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points are grouped together to form each touch region). By way of example, a watershed algorithm can be used. Once the boundaries are determined, the data for each of the touch regions can be calculated (e.g., X, Y, Z, $\Theta$, A).

Referring again to FIG. 3, following block 304, multipoint processing method 300 proceeds to block 306 where feature classification and groupings can be performed. During classification, the identity of each of the features can be determined. For example, the features can be classified as a particular finger, thumb, palm or other object. Once classified, the features can be grouped. The manner in which the groups are formed can widely vary. In most cases, the features can be grouped based on some criteria (e.g., they carry a similar attribute). For example, the two features shown in FIG. 4a and FIG. 4b can be grouped together because each of these features is located in proximity to each other or because they are from the same hand. The grouping can include some level of filtering to filter out features that are not part of the touch event. In filtering, one or more features can be rejected because they either meet some predefined criteria or because they do not meet some predefined criteria. By way of example, one of the features can be classified as a thumb located at the edge of a tablet PC. Because the thumb is being used to hold the device rather than being used to perform a task, the feature generated therefrom can be rejected, i.e., is not considered part of the touch event being processed.

Figure 5:
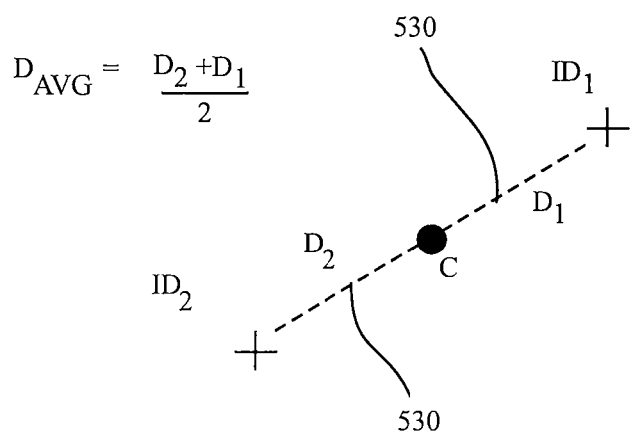
FIG. 5 illustrates an exemplary group of features according to one embodiment of this invention.

Following block 306, multipoint processing method 300 proceeds to block 308 where key parameters for the feature groups can be calculated. The key parameters can include distance between features, X/Y centroid of all features, feature rotation, total pressure of the group (e.g., pressure at centroid), and the like. As shown in FIG. 5, the calculation can include finding the centroid C, drawing a virtual line 530 to each feature from the centroid C, defining the distance D for each virtual line ($D_1$ and $D_2$), and then averaging the distances $D_1$ and $D_2$. Once the parameters are calculated, the parameter values can be reported. The parameter values can be typically reported with a group identifier (GID) and number of features within each group (in this case three). In most cases, both initial and current parameter values can be reported. The initial parameter values can be based on set down, i.e., when the user sets their fingers on the touch screen, and the current values can be based on any point within a stroke occurring after set down.

Referring again to FIG. 3, blocks 302-308 can be repetitively performed during a user stroke thereby generating a plurality of sequentially configured signals. The initial and current parameters can be compared in later steps to perform actions in the system.

Following block 308, the process flow proceeds to block 310 where the group can be associated with a user interface (UI) element. UI elements can be buttons boxes, lists, sliders, wheels, knobs, etc. Each UI element can represent a component or control of the user interface. The application behind the UI element(s) can have access to the parameter data calculated in block 308. In one implementation, the application can rank the relevance of the touch data to the UI element corresponding there to. The ranking can be based on some predetermined criteria. The ranking can include producing a figure of merit and, whichever UI element has the highest figure of merit, giving it sole access to the group. There can even be some degree of hysteresis as well (e.g., once one of the UI elements claims control of that group, the group sticks with the UI element until another UI element has a much higher ranking). By way of example, the ranking can include determining proximity of the centroid (or features) to the image object associated with the UI element.

Following block 310, multipoint processing method 300 proceeds to blocks 312 and 314. Blocks 312 and 314 can be performed approximately at the same time. From the user perspective, in one embodiment, blocks 312 and 314 appear to be performed concurrently. In block 312, one or more actions can be performed based on differences between initial and current parameter values, and can also be based to a UI element to which they are associated, if any. In block 314, user feedback pertaining to the one ore more action being performed can be provided. By way of example, user feedback can include display, audio, tactile feedback and/or the like.

Figure 6:
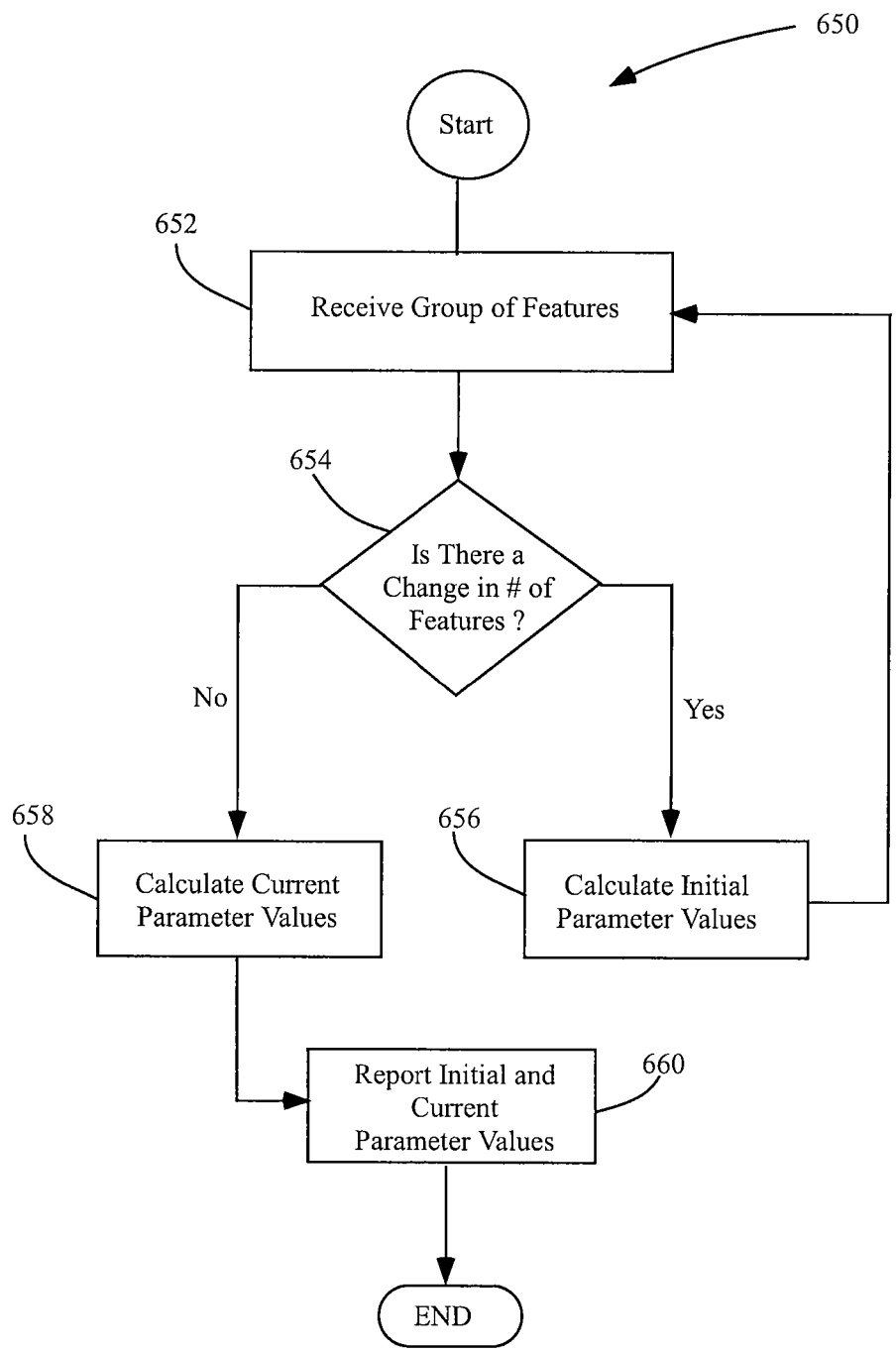
FIG. 6 illustrates an exemplary parameter calculation method according to one embodiment of this invention.

FIG. 6 illustrates a parameter calculation method 650 in accordance with embodiments of the invention. Parameter calculation method 650 can, for example, correspond to block 308 shown in FIG. 3. The parameter calculation method 650 generally begins at block 652 where a group of features can be received. Following block 652, the parameter calculation method 650 proceeds to block 654 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 650 proceeds to block 656 where the initial parameter values can be calculated. If the number stays the same, the parameter calculation method 650 proceeds to block 658 where the current parameter values can be calculated. Thereafter, the parameter calculation method 650 proceeds to block 660 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. For example, finger pinching, rotation and tapping gestures (collectively referred to as finger motions) combined with translation and optionally liftoff can be created to effect user commands to select an object, move an object, scroll an object, and the like. The detection and implementation of such gestures can be performed by a processor executing firmware or software.

Finger Pinch.

Figure 7A:
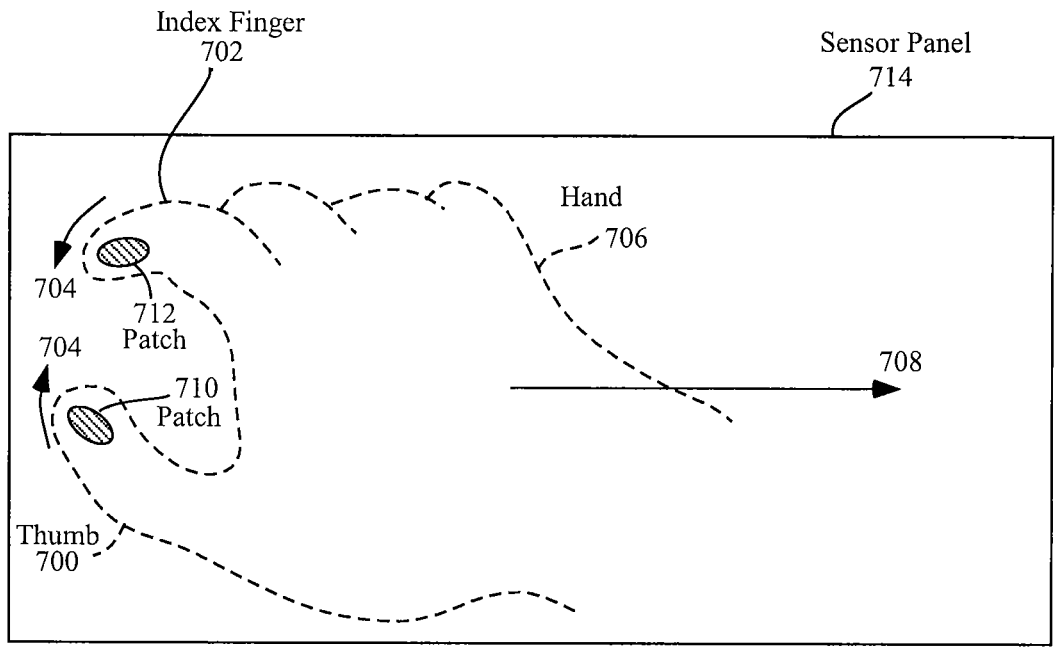
FIG. 7a illustrates an exemplary combined finger pinch/translation gesture according to one embodiment of this invention.

FIG. 7a illustrates an exemplary combined finger pinch/translation gesture according to embodiments of the invention. In FIG. 7a, a user's thumb 700 and index finger 702 (although other fingers could be used), while in contact with touch sensor panel 714, can be brought together (see arrows 704) at the same time that the entire hand 706 is moved (translated) to the right (see arrow 708) (although the translation can occur in other directions, such as left, up, down, or diagonally). Thumb 700 and index finger 702 can cause patches 710 and 712 to appear in an image of touch gathered from a scan of sensor panel 714.

Figure 7B:
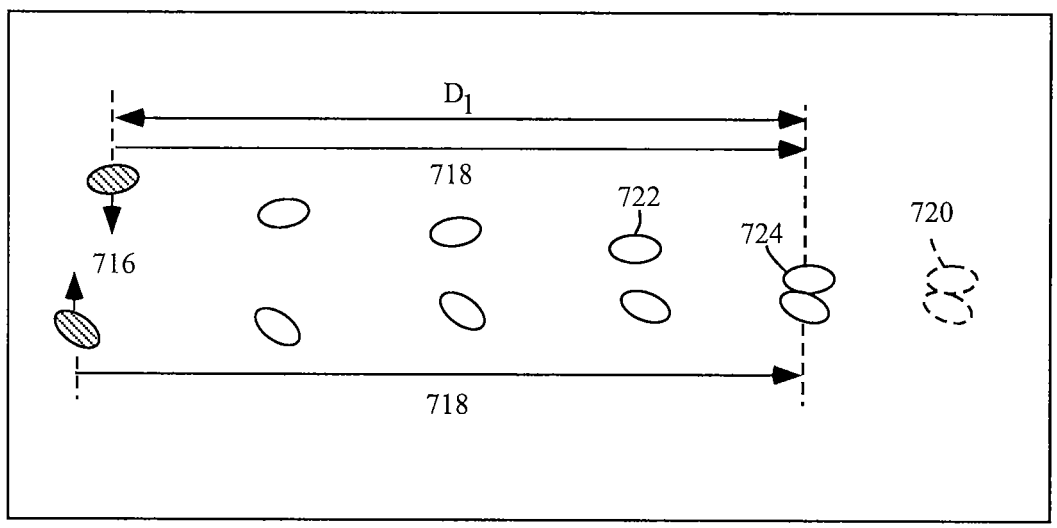
FIG. 7b illustrates exemplary superimposed images of touch at times T0-T4 as a combined finger pinch/translation gesture is being performed according to one embodiment of this invention.

FIG. 7b illustrates exemplary superimposed images of touch at times T0-T4 as a combined finger pinch/translation gesture is being performed according to embodiments of the invention. To detect the images of touch as a finger pinch, actual images of touch captured over time can be compared to expected images of touch. For example, in FIG. 7b two actual images of touch can be expected to move closer together over time. To detect both the pinch gesture and the translation, a certain amount of gesture scaling speed can be detected along with a certain amount of translation speed. The scaling speed can be computed as the dot product of the velocity vectors (see vectors 716) of the two or more fingers coming together (in the Y-direction in the example of FIG. 7b). The translation speed can be computed as the average of the velocity vectors (see vectors 718) of any fingers involved in the gesture (in the X-direction in the example of FIG. 7b). Computation of the translation speed and scaling speed of finger pinch gestures is described in U.S. Pat. No. 6,323,846 entitled "Method and Apparatus for Integrating Manual Input," the contents of which are incorporated by reference herein for all purposes.

The amount of gesture scaling speed and translation speed needed to recognize a combined finger pinch/translation gesture with can be a predetermined ratio. For example, in one embodiment the scaling speed of the fingers coming together can be required to be at least 30% of the translation speed of the fingers in order for a combined finger pinch/translation gesture to be recognized. In addition, the translation distance (D1 in the example of FIG. 7b) can be integrated over time, and if it exceeds a predetermined threshold, the combined finger pinch/translation gesture can be recognized as an actionable gesture.

Because a user is unlikely to translate exactly in the X-direction, for example, there can be some allowable jitter in the Y-direction coming through on the dot-products and cross-products (off-axis jitter). In some embodiments, translation can be limited to the X direction, which can be more natural for a user and easier to implement, and any translation in the Y direction can be ignored. Alternatively, translation movements can be limited to a certain axis or cone starting from the original touch areas.

In some embodiments, the combined finger pinch/translation gesture can be combined with finger liftoff. Liftoff itself can be detected as an absence of an image of touch (or a reduced image of touch indicative of fingers now hovering over the sensor panel rather than touching it) in a particular location of the sensor panel as compared to previously captured images of touch. In the example of FIG. 7b, liftoff can be detected at time T5 when no image of touch or a reduced image of touch (see patches 720) is detected. Speed at the time of liftoff can be determined by comparing finger patch positions in one or more frames (e.g. patches 722 and 724 at times T3 and T4) just prior to liftoff to determine velocity at liftoff. Detecting the velocity of fingers at liftoff is described in U.S. Pat. No. 6,323,846 entitled "Method and Apparatus for Integrating Manual Input." If the velocity of sliding fingers at lift-off is above a predetermined threshold, the combined finger pinch/translation/liftoff gesture can be recognized.

A combined finger pinch/translation gesture in the proximity of a GUI object can indicate grabbing the GUI object and moving it. For example, a user can pinch the GUI object to grab it while dragging it to a desired location by translating the pinching fingers along the sensor panel surface to a desired drop location.

Because a combined finger pinch/translation/liftoff gesture is a "dramatic" gesture, it can be used to throw a GUI object in the trash or to another desktop or window, minimize a window (pinch to minimize while translating to send the minimized window down to a corner), or send a file to a printer (pinch to select while translating to a printer icon), and the like. Another embodiment can be a pinch and pick up gesture, wherein proximity sensors detect the direction of the hand after pickup. A screen may then be activated in that direction (either highlighted or opened).

A combined finger pinch/translation/liftoff gesture can also be used to continue certain operations, such as the continuation of a scrolling motion. For example, in the case of scrolling, if the velocity of sliding fingers at lift-off is above a predetermined threshold, an artificial momentum vector can be computed (velocity multiplied by mass), where the "mass" of item being scrolled can be assigned in any number of ways, including the number of items in a list, the number of lines in a file, the amount of force being applied by the fingers (as determined by the size of the images of touch) when the scrolling gesture was recognized, and the like. The momentum can then gradually decay over time in an auto-regressively smooth decline until scrolling stops completely, perhaps with some bouncing before stopping.

Finger Rotation.

Figure 8A:
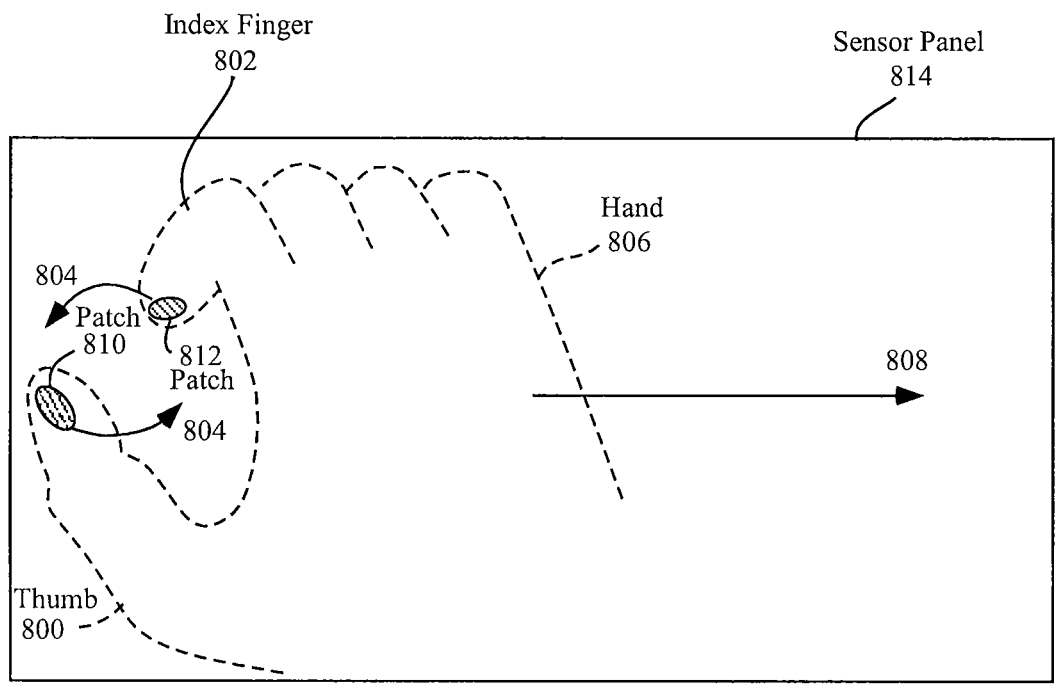
FIG. 8a illustrates an exemplary combined finger rotation/translation gesture according to one embodiment of this invention.

FIG. 8a illustrates an exemplary combined finger rotation/translation gesture according to embodiments of the invention. In FIG. 8a, a user's thumb 800 and index finger 802 (although other fingers could be used), while in contact with touch sensor panel 814, can be rotated around an imaginary axis (see arrows 804) at the same time that the entire hand 806 is moved (translated) to the right (see arrow 808) (although the translation can occur in other directions, such as left, up, down, or diagonally). Thumb 800 and index finger 802 cause patches 810 and 812 to appear in an image of touch gathered from a scan of sensor panel 814.

Figure 8B:
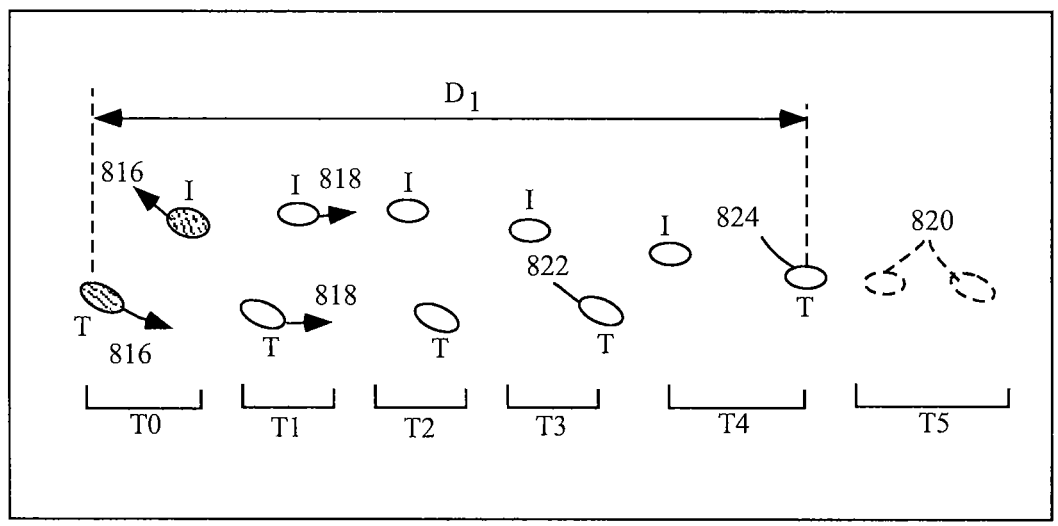
FIG. 8b illustrates exemplary superimposed images of touch at times T0-T4 as a combined finger rotation/translation gesture is being performed according to one embodiment of this invention.

FIG. 8b illustrates exemplary superimposed images of touch at times T0-T4 as a combined finger rotation/translation gesture is being performed according to embodiments of the invention. To detect the images of touch as a finger rotation, actual images of touch captured over time can be compared to expected images of touch. For example, in FIG. 8b each of the two actual images of touch can be expected to rotate in the same direction (clockwise or counterclockwise) over time. To detect both the rotation gesture and the translation, a certain amount of gesture rotation speed can be detected along with a certain amount of translation speed. The rotation speed can be computed as the cross product of the velocity vectors of the rotating fingers (see vectors 816) of the two or more rotating fingers. The translation speed can be computed as the average of the velocity vectors (see vectors 818) of any fingers involved in the gesture (in the X-direction in the example of FIG. 8b). Computation of the translation speed and rotation speed of rotational gestures is described in U.S. Pat. No. 6,323,846 entitled "Method and Apparatus for Integrating Manual Input."

The amount of gesture rotation speed and translation speed needed to recognize a combined finger pinch/translation gesture with can be a predetermined ratio. For example, in one embodiment the rotation speed of the rotating fingers can be required to be at least 30% of the translation speed of the fingers in order for a combined finger rotation/translation gesture to be recognized. In addition, the translation distance (D1 in the example of FIG. 8b) can be integrated over time, and if it exceeds a predetermined threshold, the combined finger rotation/translation gesture can be recognized as an actionable gesture.

In some embodiments, the combined finger rotation/translation gesture can be combined with finger liftoff. In the example of FIG. 8b, liftoff can be detected at time T5 when no image of touch or a reduced image of touch (see patches 80) is detected. Speed at the time of liftoff can be determined by comparing finger patch positions in one or more frames (e.g. patches 822 and 824 at times T3 and T4) just prior to liftoff to determine velocity at liftoff. If the velocity of sliding fingers at lift-off is above a predetermined threshold, the combined finger pinch/translation/liftoff gesture can be recognized.

A combined finger rotation/translation/liftoff gesture in the proximity of a GUI object can be used to spin the GUI object off to a virtual desktop.

Finger Taps.

Figure 9A:
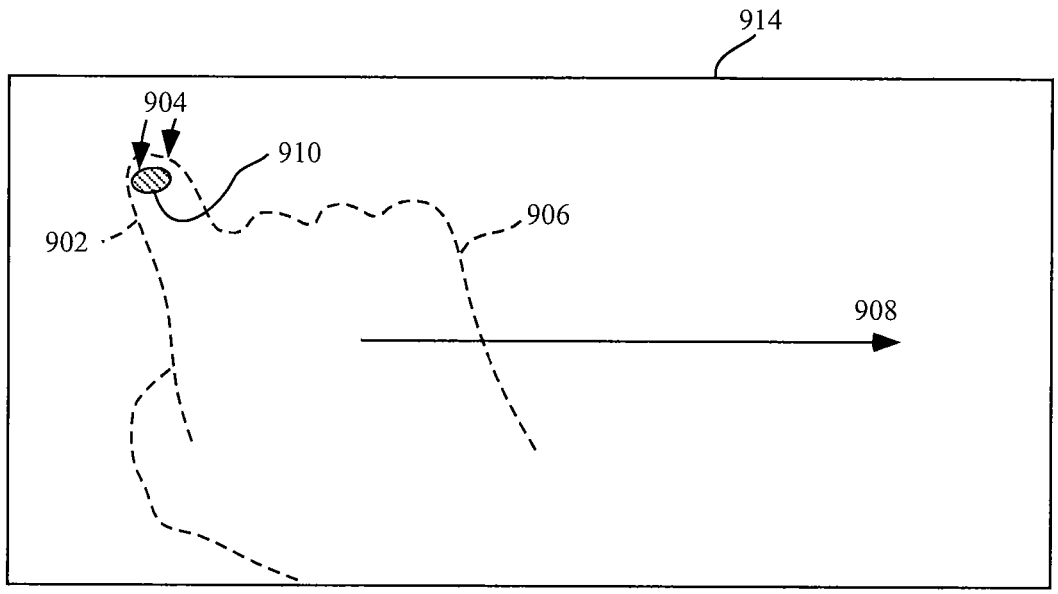
FIG. 9a illustrates an exemplary combined finger tap/translation gesture according to one embodiment of this invention.

FIG. 9a illustrates an exemplary combined finger tap/translation gesture according to embodiments of the invention. In FIG. 9a, a user's index finger 902 (although other fingers could be used) can tap touch sensor panel 914 one or more times (see arrows 904) followed by a translation of the entire hand 906 to the right (see arrow 908) (although the translation can occur in other directions, such as left, up, down, or diagonally). The one or more taps each can indicate different operations. The one or more taps can end with finger 902 raised above touch sensor panel 914, or with the finger touching the panel. Index finger 902 causes patch 910 to appear in an image of touch gathered from a scan of sensor panel 914.

Figure 9B:
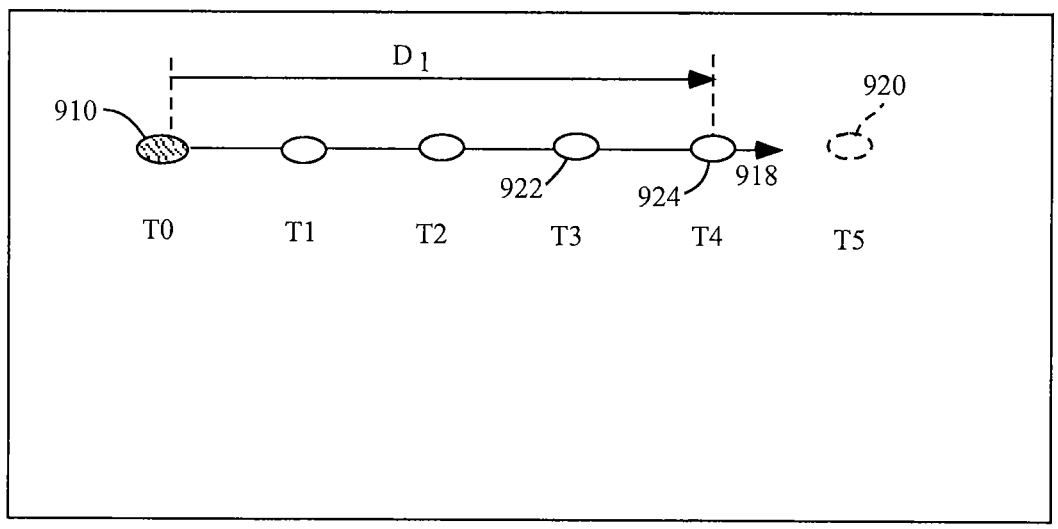
FIG. 9b illustrates exemplary superimposed images of touch or hover at times T0-T4 as a combined finger tap/translation gesture is being performed according to one embodiment of this invention.

FIG. 9b illustrates exemplary superimposed images of touch or hover at times T0-T4 as a combined finger tap/translation gesture is being performed according to embodiments of the invention. To detect both the tap gesture and the translation, one or more taps can be detected followed by a certain amount of translation speed. The one or more taps can be detected as one or more unique images of touch appearing and disappearing at about the same location on the sensor panel within a certain period of time (see location 910 in the example of FIG. 9b). The translation of the hand can occur with the finger hovering above sensor panel, in which case the images of touch captured at T1-T4 can represent a hovering finger, or with the finger touching the sensor panel, in which case the images of touch captured at T2-T4 can represent a finger touching the sensor panel. A hovering finger can be detected either by touch sensors having near-field proximity detection capabilities or proximity sensors having far-field proximity detection capabilities. Detection of hover events are described in greater detail in commonly assigned co-pending U.S. application Ser. No. 10/840,862 entitled "Multipoint Touchscreen," published as U.S. Publication No. US2006/0097991, and issued on Feb. 16, 2010 as U.S. Pat. No. 7,663,607, co-pending U.S. application Ser. No. 11/649,998 entitled "Proximity and Multi-Touch Sensor Detection and Demodulation," published as U.S. Publication No. 2008/0158172, co-pending U.S. application Ser. No. 11/619,595 entitled "Multi-Event Input System," published as U.S. Publication No. 2008/0158170, and issued on Aug. 17, 2010 as U.S. Pat. No. 7,777,732, and U.S. application Ser. No. 11/619,464 entitled "Multi-Touch Input Discrimination," published as U.S. Publication No. 2008/0158145, and issued on Dec. 21, 2010 as U.S. Pat. No. 7,855,718, the contents of each which are incorporated herein by reference.

The translation speed can be computed as the average of the velocity vector (see vector 918) of any fingers involved in the gesture (in the X-direction in the example of FIG. 9b). In addition, the translation distance (D1 in the example of FIG. 9b) can be integrated over time, and if the translation speed and distance exceeds predetermined thresholds, the combined finger tap/translation gesture can be recognized as an actionable gesture.

Because a user is unlikely to translate exactly in the X-direction, for example, there can be some allowable jitter in the Y-direction. In some embodiments, translation can be limited to the X direction, which can be more natural for a user and easier to implement, and any translation in the Y direction can be ignored. Alternatively, translation movements can be limited to a certain axis or cone starting from the original touch areas.

In some embodiments, the combined finger tap/translation gesture can be combined with finger liftoff. Liftoff itself can be detected as an absence of an image of touch (or a reduced image of touch indicative of fingers now hovering over the sensor panel rather than touching it) in a particular location of the sensor panel as compared to previously captured images of touch. In the example of FIG. 9b, liftoff can be detected at time T5 when no image of touch or a reduced image of touch (see patch 920) is detected after having detected an actual image of touch in preceding frames T1-T4. Speed at the time of liftoff can be determined by comparing finger patch positions in one or more frames (e.g. patches 922 and 924 at times T3 and T4) just prior to liftoff to determine velocity at liftoff. If the velocity of the finger at lift-off is above a predetermined threshold, the combined finger tap/translation/liftoff gesture can be recognized.

A combined finger tap/translation gesture in the proximity of a GUI object can indicate selecting the GUI object and moving it. For example, a user can tap the GUI object to select it, and then drag it to a desired location by translating the finger along or above the sensor panel surface to a desired drop location.

Because a combined finger tap/translation/liftoff gesture is a "dramatic" gesture, it can be used to select (tap and hold) and throw a GUI object in the trash or to another desktop or window, minimize a window (tap and hold to select, and then translate to send the minimized window down to a corner), or send a file to a printer (tap to select, and then translate to a printer icon), and the like.

A combined finger tap/translation/liftoff gesture can also be used to continue certain operations, such as the continuation of a scrolling motion. For example, in the case of scrolling, if the velocity of the sliding finger at lift-off is above a predetermined threshold, an artificial momentum vector can be computed (velocity multiplied by mass), where the "mass" of item being scrolled can be assigned in any number of ways, including the number of items in a list, the number of lines in a file, the amount of force being applied by the finger (as determined by the size of the images of touch) when the scrolling gesture was recognized, and the like. The momentum can then gradually decay over time in an auto-regressively smooth decline until scrolling stops completely, perhaps with some bouncing before stopping.

Figure 10A:
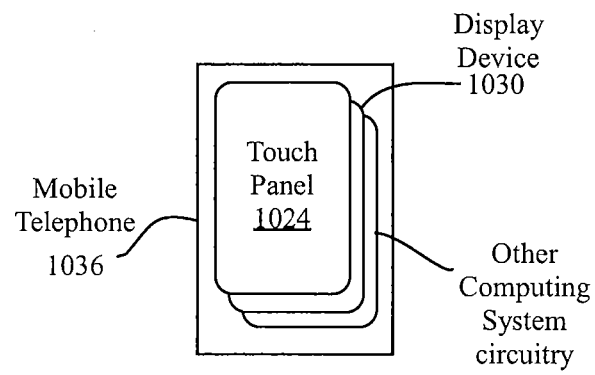
FIG. 10a illustrates an exemplary mobile telephone that can include a touch sensor panel, display device, and other computing system blocks in the computing system of FIG. 1 that can detect the combined gesture/translation/liftoff operations according to one embodiment of this invention.

FIG. 10a illustrates an exemplary mobile telephone 1036 that can include touch sensor panel 1024, display device 1030, and other computing system blocks in computing system 100 of FIG. 1 that can detect the combined gesture/translation/liftoff operations according to embodiments of the invention.

Figure 10B:
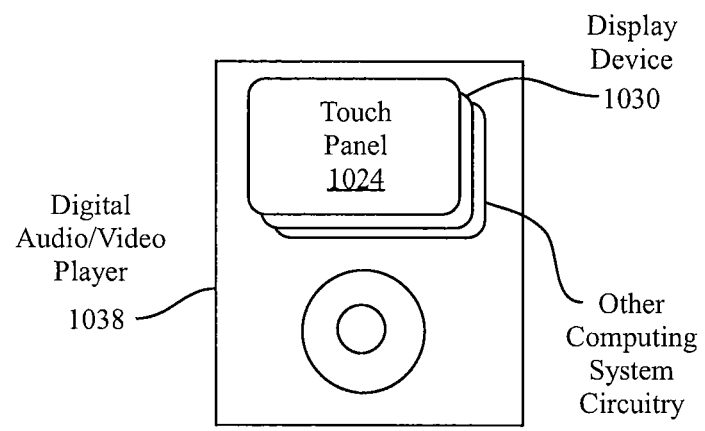
FIG. 10b illustrates an exemplary digital audio/video player that can include a touch sensor panel, display device, and other computing system blocks in the computing system of FIG. 1 that can detect the combined gesture/translation/liftoff operations according to one embodiment of this invention.

FIG. 10b illustrates an exemplary digital audio/video player 1038 that can include touch sensor panel 1024, display device 1030, and other computing system blocks in computing system 100 of FIG. 1 that can detect the combined gesture/translation/liftoff operations according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for recognizing a combined tap and translation gesture on a sensor panel, comprising:
   detecting object motion of one or more objects on the sensor panel;
   identifying a tap gesture associated with the object motion;
   identifying a translation of the one or more objects independent of the object motion associated with the tap gesture following a performance of the tap gesture;
   recognizing the tap gesture and the translation as a combined tap and translation gesture distinct from the tap gesture and the translation; and
   performing one of a plurality of different operations associated with the combined tap and translation gesture based on a number of a series of one or more taps in the identified tap gesture.

2. The method of claim 1, further comprising:
   computing a translation speed of the one or more objects involved in the translation; and
   recognizing the tap gesture and the translation as the combined tap and translation gesture distinct from the tap gesture and the translation if the translation speed is greater than a first predetermined threshold.

3. The method of claim 1, further comprising:
   identifying the tap gesture by comparing actual images of touch captured over time to expected images of touch for various tap gesture types.

4. The method of claim 3, further comprising:
   identifying the tap gesture by determining that the actual images of touch captured over time are substantially similar to one or more object taps in substantially the same location within a predetermined period of time.

5. The method of claim 4, further comprising:
   determining a translation distance of the one or more objects involved in the translation; and
   recognizing the tap gesture and the translation as the combined tap and translation gesture only if additionally the translation distance is greater than a predetermined translation threshold.

6. The method of claim 4,
   wherein the operation is a drag and drop operation capable of moving a graphical user interface (GUI) object located under the tap gesture to a drop location when the translation moves the actual images of touch to the drop location.

7. The method of claim 4, further comprising:
   determining whether a liftoff of the one or more objects occurred;
   computing a liftoff velocity of the one or more objects at a time of the liftoff; and
   recognizing the tap gesture, translation and liftoff as a combined tap, translation and liftoff gesture if the liftoff velocity is greater than a predetermined liftoff velocity threshold.

8. The method of claim 4,
   wherein the operation is a trash operation capable of moving a graphical user interface (GUI) object located under the tap gesture to the trash when the translation moves the actual images of touch towards a trash icon.

9. The method of claim 4,
   wherein the operation is a move to another desktop operation capable of moving a graphical user interface (GUI) object located under the tap gesture to another desktop when the translation moves the actual images of touch towards the other desktop.

10. The method of claim 4,
    wherein the operation is a window minimize operation capable of minimizing a window located under the tap gesture when the translation moves the actual images of touch towards a corner of a desktop.

11. The method of claim 4,
    wherein the operation is a print operation capable of printing an image associated with a graphical user interface (GUI) object located under the tap gesture when the translation moves the actual images of touch towards a printer icon.

12. The method of claim 4,
    wherein the operation is a scrolling operation capable of scrolling a graphical user interface (GUI) object located under the tap gesture when the translation moves the actual images of touch in a particular direction to be scrolled.

13. The method of claim 12, further comprising:
    performing the scrolling operation with a gradual decay in a scrolling speed when a liftoff velocity is greater than a predetermined liftoff velocity threshold.

14. A non-transitory computer-readable storage medium comprising program code for recognizing a combined tap and translation gesture on a sensor panel, the program code for causing performance of a method comprising:
    detecting object motion of one or more objects on the sensor panel;
    identifying a tap gesture associated with the object motion;
    identifying a translation of the one or more objects independent of the object motion associated with the tap gesture following a performance of the tap gesture;
    recognizing the tap gesture and the translation as a combined tap and translation gesture distinct from the tap gesture and the translation; and
    performing one of a plurality of different operations associated with the combined tap and translation gesture based on a number of a series of one or more taps in the identified tap gesture.

15. The non-transitory computer-readable storage medium of claim 14, the program code further for causing performance of a method comprising:
    computing a translation speed of the one or more objects involved in the translation; and
    recognizing the tap gesture and the translation as the combined tap and translation gesture distinct from the tap gesture and the translation if the translation speed is greater than a first predetermined threshold.

16. The non-transitory computer-readable storage medium of claim 14, the program code further for causing performance of a method comprising:
identifying the tap gesture by comparing actual images of touch captured over time to expected images of touch for various tap gesture types.

17. The non-transitory computer-readable storage medium of claim 16, the program code further for causing performance of a method comprising:
identifying the tap gesture by determining that the actual images of touch captured over time are substantially similar to one or more object taps in substantially the same location within a predetermined period of time.

18. The non-transitory computer-readable storage medium of claim 17, the program code further for causing performance of a method comprising:
determining a translation distance of the one or more objects involved in the translation; and
recognizing the tap gesture and the translation as the combined tap and translation gesture only if additionally the translation distance is greater than a predetermined translation threshold.

19. The non-transitory computer-readable storage medium of claim 17, the program code further for causing performance of a method comprising:
wherein the operation is a drag and drop operation capable of moving a graphical user interface (GUI) object located under the tap gesture to a drop location when the translation moves the actual images of touch to the drop location.

20. The non-transitory computer-readable storage medium of claim 17, the program code further for causing performance of a method comprising:
determining whether a liftoff of the one or more objects occurred;
computing a liftoff velocity of the one or more objects at a time of the liftoff; and
recognizing the tap gesture, translation and liftoff as a combined tap, translation and liftoff gesture if the liftoff velocity is greater than a predetermined liftoff velocity threshold.

21. The non-transitory computer-readable storage medium of claim 17, the program code further for causing performance of a method comprising:
wherein the operation is a trash operation capable of moving a graphical user interface (GUI) object located under the tap gesture to the trash when the translation moves the actual images of touch towards a trash icon.

22. The non-transitory computer-readable storage medium of claim 17, the program code further for causing performance of a method comprising:
wherein the operation is a move to another desktop operation capable of moving a graphical user interface (GUI) object located under the tap gesture to another desktop when the translation moves the actual images of touch towards the other desktop.

23. The non-transitory computer-readable storage medium of claim 17, the program code further for causing performance of a method comprising:
wherein the operation is a window minimize operation capable of minimizing a window located under the tap gesture when the translation moves the actual images of touch towards a corner of a desktop.

* * * * *